June 26, 1962 W. H. NEELY 3,040,343
TRIM CONNECTING MEANS
Filed March 10, 1959 2 Sheets-Sheet 1

INVENTOR.
WILLIAM H. NEELY
BY
Gustav A. Usoff
ATT.

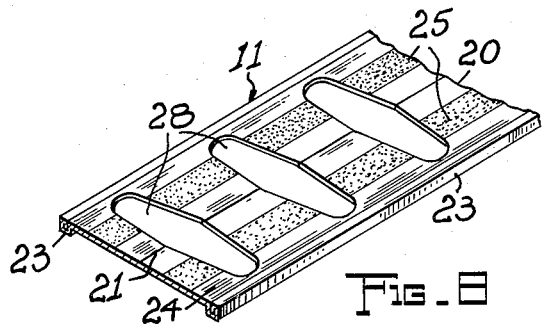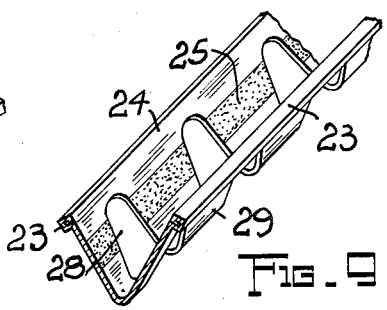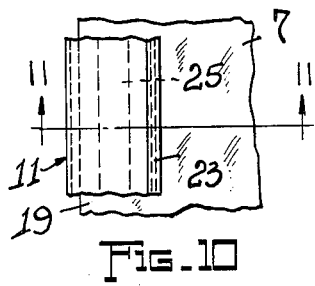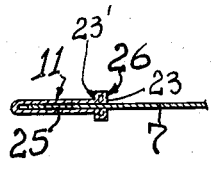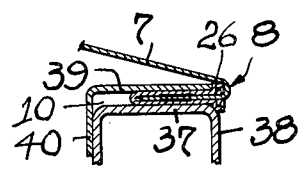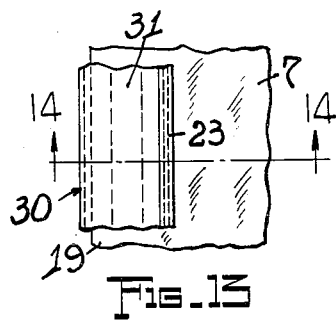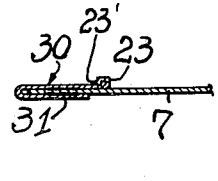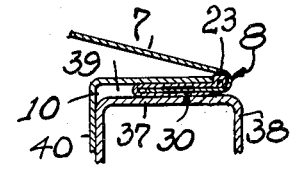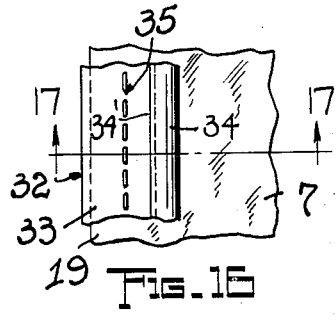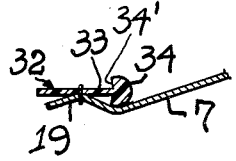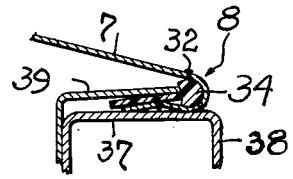

United States Patent Office 3,040,343
Patented June 26, 1962

3,040,343
TRIM CONNECTING MEANS
William H. Neely, Cleveland, Ohio, assignor, by mesne assignments, to Hoover Ball & Bearing Co., Saline, Mich., a corporation of Michigan
Filed Mar. 10, 1959, Ser. No. 798,466
3 Claims. (Cl. 5—353.2)

This invention relates to means for attaching trim material such as fabric, leather, plastic, etc., to frame structures of aircraft, automobiles, automobile and furniture seats, etc., and has particular reference to trim connecting means securing trim material to frame structures.

The principal object of this invention is the provision of a simple and practical trim connecting means adapted to releasably connect trim material to structural frames and frames of vehicles and seats of the general type referred to above, which trim connecting means includes an elongated female member of any desired shape and an elongated trim material mounting male member releasably extended into the female member.

The trim connecting means, according to the invention, embodies a female member with a U-shaped channel and a headed, flanged male member mounting on its flanged portion trim material and resting with its head portion, which is larger in cross section than the width of the U-shaped channel, upon the edge of the U-shaped channel to prevent damage to the trim material by said edge.

Another object of the invention therefore is the provision of trim connecting means of the type referred to above, embodying a female member with a substantially U-shaped channel and a headed, flanged, flexible male member having a flanged portion secured to an edge portion of trim material and dimensioned to readily extend into the U-shaped channel of the female member and a head portion dimensioned larger than the width of the U-shaped channel to prevent extension into the U-shaped channel and permit resting upon the outer edge of the channel so as to avoid damage to the trim material by contact with such outer edge of the U-shaped channel.

A further object of the invention is the provision of a trim connecting means of the type referred to above, in which the male member embodies an elongated, folded strip of flexible material beaded at least at one side, the strip being symmetrically folded over an edge of trim material and secured thereto to attach the trim material to the headed, flanged male member.

Still another object of the invention is the provision of a trim connecting means of the type referred to above, in which the elongated, folded strip of flexible material is beaded at opposite sides, crosswise notched, symmetrically folded over an edge portion of trim material and secured thereto to attach a more flexible, headed, flanged male member to said trim material.

A still further object of the invention is the provision of a trim connecting means of the type referred to above, in which the elongated, folded strip portion forming the headed, flanged male member includes at one side heat-responsive cement means and is secured to opposite sides of the trim material by heat-setting of the cement means.

Still other objects of the invention lie in the provision of a trim connecting means of the type referred to above, with resilient headed, flanged male members having trim material attached thereto and specifically constructed female members associated with seat frames and panel structures for any desired edge design of seat structures and their trim material connections.

Additional other objects and novel features of construction, combinations and relations of parts by which the objects in view have been attained, will appear and are set forth in detail in the course of the following specification. The drawings, accompanying and forming part of the specification, illustrate certain practical embodiments of the invention, but it will be apparent as the specification proceeds that these structures may be modified and changed in various ways without departure from the true spirit and broad scope of the invention.

In the drawings:

FIG. 8 is a view similar to FIG. 6, provided with notched-out areas to provide a notched male member.

FIG. 9 is a view similar to FIG. 7, indicating the notches in the partly folded male member.

FIG. 10 is a fragmentary plan view of the fabric trim connecting means including fabric trim attached to the male member.

FIG. 11 is a sectinal view taken on line 11—11 of FIG. 10; and

FIG. 12 is a sectional view similar to FIG. 11, the male member of the trim connecting means engaging a female member formed by frame and panel members of an upholstered spring construction.

FIG. 13 is a fragmentary plan view similar to FIG. 10, showing a modified form of male member.

FIG. 14 is a sectional view taken on line 14—14 of FIG. 13; and

FIG. 15 is a sectional view similar to FIG. 12, with the modified form of male member shown in FIG. 13.

FIG. 16 is a fragmentary plan view similar to FIG. 10, and another modified form of male member of flexible material and fabric trim stitched thereto.

FIG. 17 is a sectional view taken on line 17—17 of FIG. 16; and

FIG. 18 is a sectional view similar to FIG. 12, with the modified form of male member shown in FIGS. 16 and 17.

Figure 1:
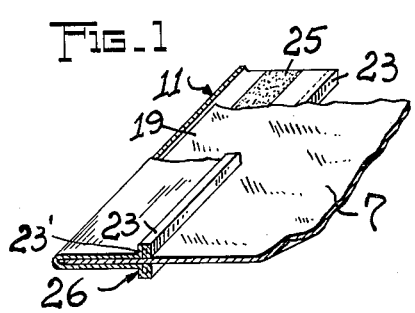
FIG. 1 is a fragmentary perspective view of a flexible, headed, flanged male member of a fabric trim connection constructed in accordance with the invention, the male member engaging with its flanged portion fabric trim connected thereto.

Referring more particularly to the exemplified form of the invention shown in the drawings, reference numeral 2 denotes an upholstered back rest spring construction including a rectangular back frame 3 and a plurality of springs 4 mounted thereon and forming a spring structure 5 which is padded by pad 6 and covered by a cover 7 of fabric, leather, or plastic tensioned over pad 6 and secured to frame 3 by trim connecting means 8.

Figure 2:
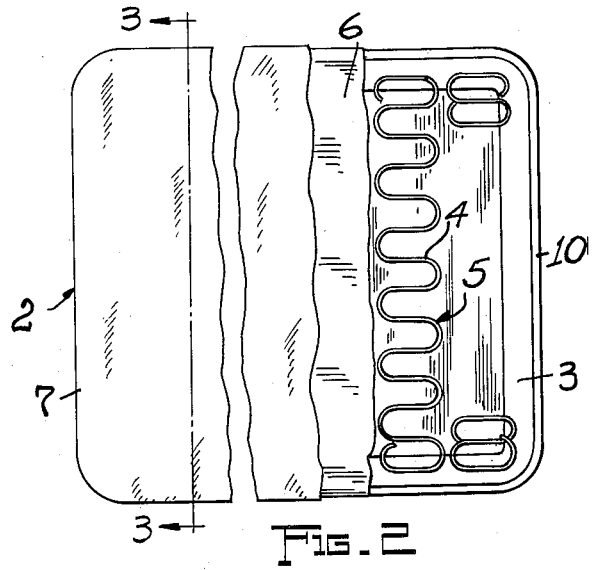
FIG. 2 is a plan view, partly in section, of an upholstered back rest spring construction having its cover secured to the frame of the back rest spring construction by trim connections according to the invention.
Figure 3:
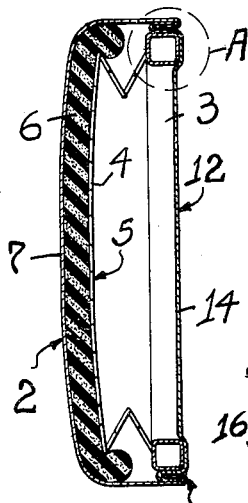
FIG. 3 is a transversal sectional view through FIG. 2 taken on line 3—3 of FIGURE 2.
Figure 4:
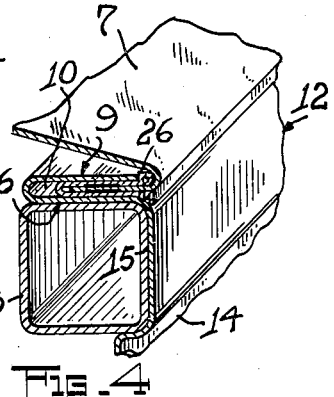
FIG. 4 is an enlarged fragmentary perspective view of a portion of the upholstered back rest spring construction shown in FIG. 3, the portion shown being marked by A.
Figure 5:
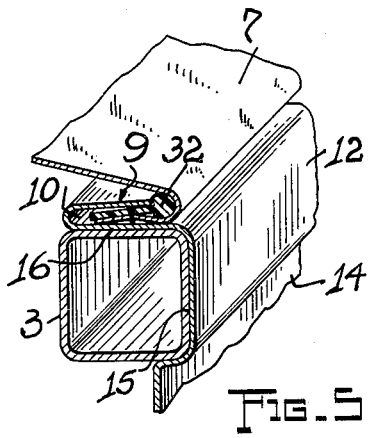
FIG. 5 is a perspective view similar to FIG. 4, showing a somewhat modified form of male member of the trim connecting means.
Figure 6:
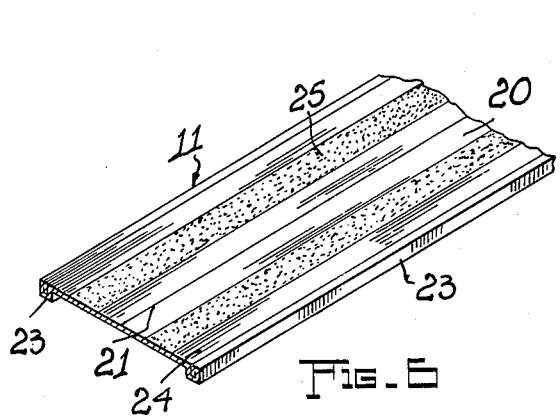
FIG. 6 is a fragmentary perspective view of a male member of the trim connecting means prior to its bending and securing fabric trim thereto.
Figure 7:
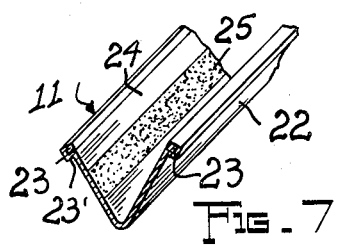
FIG. 7 is a fragmentary perspective view of the male member shown in FIG. 6, partly symmetrically folded prior to engagement with fabric trim.

Trim connecting means 8 embodies an elongated female member 9 with a substantially U-shaped channel 10 and an elongated male member 11. Female member 9, which may be constructed either as an individual structure secured to frame 3, a structure forming an integral part of frame 3, a structure formed by frame 3 and back rest trim panel 12 of the upholstered back rest spring construction 2 or a structure forming an integral part of the back rest trim panel 12, is shown in FIGS. 2, 3, 4 and 5 as an integral part of back rest trim panel 12, attached to frame 3 in any suitable manner.

This back rest trim panel 12 includes a central body portion 14 abutting rear face 15 of frame 3 and an outer rim portion 16 which is forwardly extended from body portion 14 and has its marginal portion rearwardly bent to encircle trim panel 12 with rearwardly exposed U-shaped channel 10.

The male member 11 is attached to edge portion 19 of cover 7 and cooperates with the U-shaped channel 10 of female member 9 in releasably securing cover 7 to upholstered back rest spring construction 2. Male member 11 embodies an elongated, relatively thin strip 20 of flexible material (stiff paper, thin fiber board, etc.) which is longitudinally scribed at 21 to facilitate folding around the edge of cover 7, and has its marginal side portions folded or rolled in a manner to provide outer face 22 of strip 20 with side ribs 23.

Strip 20 includes on its inner face 24 layers 25 of heat-responsive cement to permit heat-setting of strip 20 when folded around the margin of cover 7 so as to provide male member 11 with a head portion 26 formed by opposed side ribs 23. An abutment ledge 23' is defined between the strip and head portions of the male member 11. Flexibility of male member 11 is greatly increased by cutting in strip 20 crosswise thereof symmetrically shaped openings 28 (FIG. 8) which provide the strip in its folded condition with cone-shaped fingers 29 extended from ribs 23.

The male and female members of trim connecting means 8 may have different shape. Thus, male member 30 (FIG. 14) is identical in construction to male member 11 previously described, with the exception that strip 31 of male member 30 embodies at one side only rib 23 and abutment ledge 23'. Male member 32 (FIG. 17) consists of a flexible plastic strip 33 provided at one side edge with a rib portion 34 which forms the head portion and abutment ledge 34' of such male member. Male member 32 has edge portion 19 of cover 7 directly attached thereto by sewing edge portion 19 to the flexible plastic strip 33 of male member 32 (see line 35 in FIG. 16).

A differently constructed female member 36 is shown in FIG. 12, which female member is formed by wall 37 of rectangular frame 38 and wall portion 39 of an angle plate 40 secured in any suitable manner to side wall 41 of frame 38, so as to extend wall portion 39 of said angle plate in spaced parallel relation to top wall 37 of frame 38 and form the U-shaped channel 10 of the trim connecting means 8.

All male members include flexible strip portions adapted to be extended into the U-shaped channels of the female members, and head portions dimensioned to rest on one of the outer edges of the U-shaped channels. The width of the strip portions is less than the depth of the channel 10, and the cross-sectional width of the head portions is larger than the width of the U-shaped channels. In this way, cooperative engagement of the abutment ledges against the top of the channel is insured, and accidental insertion of the head portion into the channel is prevented. This arrangement prevents direct contact of the cover with the generally sharp edge of the wall of the U-shaped channels and any damage to the cover by thus constructed trim connecting means.

The trim connecting means, when used in back rest spring constructions, have their female members attached to frame and metal parts of the construction and their male members secured or attached to the margin of the cover, so that coupling action of the trim connecting means can readily be effected by slipping the male member into the U-shaped channel until the head portion rests upon an edge portion of the U-shaped channel, in which position the male members are kept by the spring force exerted on the cover by the cushion springs of the upholstered back rest spring construction.

While there have been shown and described several embodiments of this invention, it will be obvious to those skilled in the art that various changes and modifications may be made therein without departing from the invention and, therefore, it is intended in the appended claims to cover all such changes and modifications as fall within the true spirit and scope of the invention.

Having thus described my invention; what I claim is:

1. In a seat construction which includes a frame and a non-rigid cover adapted to be tensioned over said frame, means on said frame forming a channel having an opening in one side and an edge disposed at one side of said opening, a member for attaching said cover to said frame, said member having a flange portion and an enlarged head portion at one end of said flange portion, said flange portion being attached to said cover and extending into said opening to a position in which one section of said head portion engages said edge, said cover extending from said flange portion outwardly of said opening into engagement with another section of said head portion.

2. In a seat construction according to claim 1 in which said attaching member is formed of a strip of bendable material folded upon itself so as to form said flange portion of a substantially U-shape having an opening in one side bounded by the side edges of said strip, at least one of said edges being provided with a laterally outwardly directed rib which forms said head portion, said cover extending between said side edges and into said U-shape flange portion.

3. In a seat construction which includes a frame and a non-rigid cover adapted to be tensioned over said frame, means on said frame forming a channel having an elongated opening in one side and an edge disposed at one side of said opening, a member for attaching said cover to said frame, said member having a flexible flange portion of a width less than the depth of said channel and an enlarged integral head portion at one end of said flange portion of a size greater than the width of said opening, said flange portion being attached to said cover and extending into said opening to a position in which one section of said head portion engages said edge, said cover extending from said flange portion outwardly of said opening into engagement with another section of said head portion.

References Cited in the file of this patent

UNITED STATES PATENTS

| | | |
|---|---|---|
| 2,347,158 | Spraragen | Apr. 18, 1944 |
| 2,586,698 | Neely | Feb. 19, 1952 |
| 2,612,941 | Naughton | Oct. 7, 1952 |
| 2,695,051 | Naughton | Nov. 23, 1954 |
| 2,766,814 | Sedlacek | Oct. 16, 1956 |
| 2,786,711 | Culver | Mar. 26, 1957 |
| 2,832,399 | Varkala | Apr. 29, 1958 |

FOREIGN PATENTS

| | | |
|---|---|---|
| 428,670 | Great Britain | May 16, 1935 |